United States Patent Office 3,282,890
Patented Nov. 1, 1966

3,282,890
POLY-α-OLEFINS CONTAINING A DIESTER OF 3,3'-THIODIPROPIONIC ACID AND 3-HYDROXY-2,2,4-TRIMETHYLPENTYL ISOBUTYRATE AND OPTIONALLY A STERICALLY HINDERED PHENOL AS STABILIZERS
Hugh J. Hagemeyer, Jr., Vernon K. Park, and Alfred G. Robinson, Longview, Tex., assignors to Eastman Kodak Company, Rochester, N.Y., a corporation of New Jersey
No Drawing. Filed July 25, 1962, Ser. No. 212,485
18 Claims. (Cl. 260—45.85)

This invention relates to normally solid poly-α-olefins and to the problem of protecting them against oxidative degradation, particularly under elevated temperature conditions.

Normally solid polymers of α-olefins, generally referred to herein as poly-α-olefins, such as, for example, normally solid polyethylene, normally solid polypropylene and the like, are prone to oxidative degradation. This is particularly true at elevated temperatures; that is, temperatures above 20° C. This degradation involves rupture of the polymer chains and formation of carbonyl (=C=O) groups. Evidence of such degradation in its early stage is the presence of peroxides. As this degradation progresses, articles and coatings containing these polymers at large concentrations tend to crack, become brittle and lose tensile strength to the extent of mechanical failure.

Normally solid poly-α-olefins are commonly exposed to elevated temperatures in making useful compositions and articles out of resins containing them, and also in normal uses of some of these compositions and articles. Thus, such customary processing procedures as roll compounding, injection molding, extrusion and the like involve elevated temperatures. In such end uses as electrical insulation, protective coatings for electrical wire, plastic pipes for hot water and steam, and the like, elevated temperatures are frequently normally encountered. Hence, when normally solid poly-α-olefins, particularly isotactic or crystalline polymers such as isotactic or crystalline polypropylene and the like, and compositions containing them are subjected to these procedures and employed in such end uses, oxidative degradation of the poly-α-olefins takes place.

This invention is based upon the discovery of the 3-hydroxy-2,2,4-trimethylpentyl isobutyrate diester of 3,3'-thiodipropionic acid and its utility as a poly-α-olefin stabilizer, as a synergist for other poly-α-olefin stabilizers and as a plasticizer for resins such as poly-α-olefins generally and particularly for crystalline polymers such as isotactic polypropylene.

This invention, in summary, comprises as a new composition of matter the diester of 3,3'-thiodipropionic acid and 3-hydroxy-2,2,4-trimethylpentyl isobutyrate. In addition, this invention comprises a normally solid, poly-α-olefin composition containing the diester of 3,3'-thiodipropionic acid and 3-hydroxy-2,2,4-trimethylpentyl isobutyrate at a protective concentration.

The diester of 3,3'-thiodipropionic acid and 3-hydroxy-2,2,4-trimethylpentyl isobutyrate is a pale yellow liquid at 20° C. with an APHA color of 175. It has a boiling point range of 140–165° C. at a pressure of 9 microns of mercury. The theoretical molecular weight of the diester is about 574. It has a sulfur content of 5.6% by weight and a saponification equivalent of 143.2.

The diester of 3,3'-thiodipropionic acid and 3-hydroxy-2,2,4-trimethylpentyl isobutyrate is readily made by refluxing together a suitable esterification catalyst, 3,3'-thiodipropionic acid and 3-hydroxy-2,2,4-trimethylpentyl isobutyrate (also referred to as 2,2,4-trimethyl-1,3-pentanediol monoisobutyrate or as TMPD-MI) at a mole ratio of said monoisobutyrate to the thiodipropionic acid of at least about 2:1. The 3-hydroxy-2,2,4-trimethylpentyl isobutyrate is readily prepared by refluxing together a suitable esterification catalyst, isobutyric acid and 2,2,4-trimethyl-1,3-pentanediol at a mole ratio of the diol to the acid of about 1:1. Preferably, in both esterification procedures, the desired ester in each case is removed by conventional ways and means from the esterification reaction mixture.

The normally solid, poly-α-olefin composition of this invention comprises a normally solid resin portion and dispersed therein the diester of 3,3'-thiodipropionic acid and 3-hydroxy-2,2,4-trimethylpentyl monoisobutyrate. The resin portion consists essentially of at least one normally solid, poly-α-olefin polymer.

A normally solid, poly-α-olefin polymer is a polymer derived from an α-monoolefinic hydrocarbon having 2–10 carbon atoms. Such a polymer is provided by the normally solid homopolymers of α-monoolefinic hydrocarbons having generally 2–10 carbon atoms, preferably 2–6 carbon atoms and usually 2–4 carbon atoms. It is also provided by the normally solid copolymers (which include graft polymers, addition polymers, block and the like) of α-monoolefinic hydrocarbons having generally 2–10 carbon atoms, preferably 2–6 carbon atoms and usually 2–4 carbon atoms, as well as of these monoolefinic hydrocarbons and other compounds.

Examples of a normally solid polymer derived from an α-monoolefinic hydrocarbon having 2–10 carbon atoms are the linear and branched, low density and high density, crystalline and amorphous, normally solid, homopolymers and copolymers of ethylene, propylene, butene-1, isobutylene, pentene-1, 2-methylbutene-1, 3-methylbutene-1, hexene-1, heptene-1, octene-1, nonene-1, decene-1, 4-methylpentene-1, 4-methylhexene-1, 5-ethylhexene-1, 6-methylheptene-1, 6-ethylheptene-1, styrene, allyl benzene and the like. Processes for preparing normally solid poly-α-olefin polymers are well-known and described in detail in the prior art. See, for example, the U.S. patent, No. 2,153,553, to Fawcett et al., the U.S. patent, No. 2,912,429, to Cash, and the U.S. patent, No. 2,917,500, to Hagemeyer et al. In general, a normally solid, poly-α-olefin polymer is a thermoplastic material which at 20° C. is solid. It includes the so-called poly-α-olefin waxes which usually have average molecular weights in a range from about three thousand to about twelve thousand.

The normally solid resin portion, in addition to at least one normally solid, poly-α-olefin polymer, can also comprise other polymeric or resinous components. Thus, it can comprise a normally solid polymer derived from another α-monoolefinic hydrocarbon having generally 2–10 carbon atoms. It can comprise a different kind of polymer, which may be desired as a physical property improver.

The normally solid, poly-α-olefin composition can also comprise one or more other antioxidants, ultraviolet light inhibitors, anticorrosion additives, antistatic agents, foaming agents, additional plasticizers, pigments, mold release agents, slip agents, fillers, extenders and the like including physical property improvers other than polymeric compounds. As a matter of fact, preferred embodiments of the poly-α-olefin composition of this invention comprise not only a poly-α-olefin resin portion and the diester of 3,3-thiodipropionic acid and 3-hydroxy-2,2,4-trimethylpentyl isobutyrate, but also a sterically hindered phenol type antioxidant which forms with the diester a synergistic, poly-α-olefin stabilizing mixture. Typical hindered phenol type antioxidants include bisphenols such as an alkylidenebis(alkylphenol), a thiobisphenol and the like, and an alkyl phenol such as a 2,6-dialkyl-p-cresol and the like. Examples of a hindered phenol type antioxidant include:

2,6-di-tert. butyl-p-cresol
2,2'-methylenebis[6(1-methylcyclohexy)-p-cresol]
4,4'-butylidenebis(6-tert. butyl-m-cresol)
4,4'-thiobis(6-tert. butyl-m-cresol)

The weight ratio of the diester to the hindered phenolic antioxidant generally is in a range from about 1:20 to about 20:1 with the preferred range being from about 1:10 to about 10:1.

Concentration of the diester of 3,3'-thiodipropionic acid and 3-hydroxy-2,2,4-trimethylpentyl isobutyrate in the poly-α-olefin composition of this invention in general depends upon the degree of stabilization desired and the degree of plasticization desired. The degree of stabilization depends upon processing conditions and subsequent environmental conditions to which the poly-α-olefin composition is to be exposed. In general, however, a concentration of the diester generally in a range from about 0.01 to about 10% by weight of the total poly-α-olefin polymeric content of the composition and preferably in a range from about 0.05 to about 5% by weight of the total poly-α-olefin polymeric content is an effective concentration for most end uses of the composition. In general, within these ranges, the higher the concentration of the diester, the more plasticized is the resin portion of the composition.

The normally solid, poly-α-olefin composition of this invention is prepared by incorporating the diester of 3,3'-thiodipropionic acid and 2,2,4-trimethylphenyl isobutyrate into the normally solid resin portion of the composition. Generally, such incorporation is performed by any one of a number of known methods such as roll compounding, extrusion, solvent mixing and the like. For example, such incorporation can be performed by heating or otherwise softening the normally solid resin portion to a workable consistency and then working in, as by roll compounding, the diester until a substantially uniform mixture or dispersion is obtained. Another typical procedure is to dissolve the additives in a low boiling solvent such as, for example, acetone, and, after thoroughly mixing the resulting solution with the resin portion of the composition, which may be in flake or other such form, evaporating the solvent. While the components of the synergistic mixture of this invention are preferably incorporated together into the resin portion of the composition, it is within the scope of this invention to incorporate them separately into the resin portion. In addition, while it is preferred that the stabilizer of this invention be incorporated into the resin portion at the same time as other additives are normally incorporated into said portion, it is within the scope of this invention to undertake such incorporation at any time.

The poly-α-olefin composition of this invention is useful in coatings and as materials of construction for shaped articles. Thus, it can be made into various shaped articles, such as, for example, pellets, sheeting, films, bars, tubes, pipes, filaments, fibers, specially shaped structural elements and the like as by conventional casting and molding techniques which include extrusion, blow molding and the like.

The diester of 3,3'-thiodipropionate and 2,2,4-dimethyl-1,3-pentanediol monoisobutyrate alone and in combination with other poly-α-olefin stabilizers, upon incorporation into poly-α-olefins, results in compositions of outstanding stability and, particularly in the case of crystalline polypropylene, improved low temperature properties. In this regard, crystalline polypropylene is not suitable for use in many applications because of its high brittle point. Brittle point is the temperature at which the polymer exhibits brittle failure under specific impact conditions as measured by the ASTM Test D–746–SST. Because of polypropylene's relatively poor performance at low temperatures, its utility as a packaging material for frozen foods, wire and cable, plastic pipe, etc., has been limited. Addition of the diester of this invention to crystalline polypropylene substantially reduces its brittle point to practical levels. Hence, poly-α-olefins and particularly crystalline polypropylene stabilized in accordance with this invention have extended life expectancy and can be used more effectively and broadly than unstabilized poly-α-olefins and particularly crystalline polypropylene.

This invention is further illustrated by the following examples of various aspects thereof, including specific embodiments. This invention is not limited to these specific embodiments unless otherwise indicated.

EXAMPLE 1

This example illustrates the preparation of the diester of 3,3'-thiodipropionic acid and 2,2,4-trimethylpentyl iosbutyrate.

A mixture consisting essentially of 534 grams (3 moles) of 3,3'-thiodipropionic acid, 1620 grams (7.5 moles) of 2,2,4-trimethyl-1,3-pentanediol monoisobutyrate, 200 grams of xylene and 1.0 gram (0.004 mole) of dibutyl tin oxide is prepared and heated to reflux in a suitable esterification reactor having a water separator. After 20 hours of refluxing, typically about 108 grams (6.0 moles) of water is obtained. The reaction mixture in the reactor is then treated with steam at 180° C. to remove therefrom low boiling material and thereafter admixed with a 5% by weight, aqueous, caustic solution. The organic layer that forms is removed, dried and filtered, giving 1600 grams (2.8 moles) of the diester of 3,3'-thiodipropionic acid and 3-hydroxy-2,2,4-trimethylpentyl isobutyrate. This represents a 92% yield based on the 3,3'-thiodipropionic acid.

Specific embodiments of the poly-α-olefin composition of this invention are formulated as follows.

EXAMPLE 2

*Polypropylene composition*

| Components: | Parts by weight |
|---|---|
| Resin portion— | |
| Normally solid crystalline polypropylene | 1000 |
| Additives portion— | |
| Diester of 3,3'-thiodipropionic acid and 3-hydroxy-2,2,4-trimethylpentyl isobutyrate | 5 |

EXAMPLE 3

*Polypropylene composition*

| Components: | Parts by weight |
|---|---|
| Resin portion— | |
| Normally solid polypropylene | 1000 |
| Additives portion— | |
| Diester of 3,3'-thiodipropionic acid and 3-hydroxy-2,2,4-trimethylpentyl isobutyrate | 5 |
| 4,4'-butylidenebis(6-tert. butyl-m-cresol) | 1 |

EXAMPLE 4

*Polypropylene composition*

| Components: | Parts by weight |
|---|---|
| Resin portion— | |
| Normally solid polypropylene | 1000 |
| Additives portion— | |
| Diester of 3,3'-thiodipropionic acid and 3-hydroxy-2,2,4-trimethylpentyl isobutyrate | 5 |
| 4,4'-butylidenebis(6-tert. butyl-m-cresol) | 3 |

EXAMPLE 5

*Polypropylene composition*

Components: Parts by weight
Resin portion—
  Normally solid polypropylene _____ 1000
Additives portion—
  Diester of 3,3'-thiodipropionic acid and 3-hydroxy-2,2,4-trimethylpentyl isobutyrate _____ 5
  4,4'-thiobis(6-tert. butyl-m-cresol) _____ 1

EXAMPLE 6

*Polypropylene composition*

Components: Parts by weight
Resin portion—
  Normally solid polypropylene _____ 1000
Additives portion—
  Diester of 3,3'-thiodipropionic acid and 3-hydroxy-2,2,4-trimethylpentyl isobutyrate _____ 5
  4,4'-thiobis(6-tert. butyl-m-cresol) _____ 3

EXAMPLE 7

*Polypropylene composition*

Components: Parts by weight
Resin portion—
  Normally solid polypropylene _____ 1000
Additives portion—
  Diester of 3,3'-thiodipropionic acid and 3-hydroxy-2,2,4-trimethylpentyl isobutyrate _____ 5
  2,6-ditertiary butyl-p-cresol _____ 1

EXAMPLE 8

*Polypropylene composition*

Components: Parts by weight
Resin portion—
  Normally solid polypropylene _____ 1000
Additives portion—
  Diester of 3,3'-thiodipropionic acid and 3-hydroxy-2,2,4-trimethylpentyl isobutyrate _____ 5
  2,6-ditertiary butyl-p-cresol _____ 3

EXAMPLE 9

*Polypropylene composition*

Components: Parts by weight
Resin portion—
  Normally solid polypropylene _____ 1000
Additives portion—
  Diester of 3,3'-thiodipropionic acid and 3-hydroxy-2,2,4-trimethylpentyl isobutyrate _____ 5
  2,2' - methylenebis[6(1 - methylcyclohexyl)-p-cresol] _____ 1

EXAMPLE 10

*Polypropylene composition*

Components: Parts by weight
Resin portion—
  Normally solid polypropylene _____ 1000
Additives portion—
  Diester of 3,3'-thiodipropionic acid and 3-hydroxy-2,2,4-trimethylpentyl isobutyrate _____ 5
  2,2' - methylenebis[6(1 - methylcyclohexyl)-p-cresol] _____ 3

EXAMPLE 11

*Low brittle point, crystalline polypropylene composition*

Components: Parts by weight
Resin portion—
  Crystalline polypropylene _____ 95
Additives portion—
  Diester of 3,3'-thiodipropionic acid and 3-hydroxy-2,2,4-trimethylpentyl isobutyrate _____ 5

EXAMPLE 12

*Low brittle point, crystalline polypropylene composition*

Components: Parts by weight
Resin portion—
  Crystalline polypropylene _____ 90
Additives portion—
  Diester of 3,3'-thiodipropionic acid and 3-hydroxy-2,2,4-trimethylpentyl isobutyrate _____ 10

Compositions of Examples 2–10 are prepared, for example, by mixing the normally solid polypropylene with an acetone solution of the additives portion and thereafter evaporating the acetone by placing the mixture in a vacuum oven at 70° C. for one hour.

Compositions of the Examples 11 and 12 are prepared in each case by milling the crystalline polypropylene with the diester at 190° C. for 10 minutes.

The stabilities of the Examples 2–10 embodiments of the poly-α-olefin composition of this invention are demonstrated by the following data obtained in the stability testing of samples of these compositions and samples of similar polypropylene compositions. In these tests, samples of the compositions were placed in aluminum dishes and subjected to heat at 185° C. in a forced draft oven. Samples were removed at intervals of time indicated in the following Table I and a comparison of their colors made with a sheet of 8 standard colors ranging from white, which was rated as 1, to dark brown which was rated as 8.

The polypropylene employed in these tests in each case was a crystalline polypropylene having an inherent viscosity of 1.7 and a melting point of about 165° C.

The test results and other test conditions in this series of tests are tabulated in the following Table I.

TABLE I

| Sample No. | Additive(s) | Concentration (percent by weight of poly-α-olefin) | Color of Sample After 8 Hours | Color of Sample After 16 Hours | Color of Sample After 24 Hours |
|---|---|---|---|---|---|
| 1 | Diester of 3,3'-thiodipropionic acid and 3-hydroxy-2,2,4-trimethylpentyl isobutyrate. | 0.5 | 2 | 4 | 5 |
| 2 | Dilauryl 3,3'-thiodipropionate. | 0.5 | 4 | 5 | 8 |
| 3 | 4,4'butylidenebis(6-tert. butyl-m-cresol). | 0.5 | 4 | 5 | 6 |
| 4 | Dilauryl 3,3'-thiodipropionate. 4,4'-butylidenebis(6-tert. butyl-m-cresol). | 0.5 0.1 | 2 | 3 | 6 |
| 5 | Diester of 3,3'-thiodipropionic acid and 3-hydroxy-2,2,4-trimethylpentyl isobutyrate. 4,4'-butylidenebis(6-tert. butyl-m-cresol). | 0.5 0.1 | 2 | 3 | 4 |

TABLE I—Continued

| Sample No. | Additive(s) | Concentration (percent by weight of poly-α-olefin) | Color of Sample After 8 Hours | Color of Sample After 16 Hours | Color of Sample After 24 Hours |
|---|---|---|---|---|---|
| 6 | Diester of 3,3'-thiodipropionic acid and 3-hydroxy-2,2,4-trimethylpentyl isobutyrate. | 0.5 | | | |
|   | 4,4'-butylidenebis(6-tert. butyl-m-cresol). | 0.3 | 2 | 2 | 3 |
| 7 | 4,4'-thiobis(6-tert. butyl-m-cresol) | 0.5 | 4 | 5 | 7 |
| 8 | Diester of 3,3'-thiodipropionic acid and 3-hydroxy-2,2,4-trimethylpentyl isobutyrate. | 0.5 | | | |
|   | 4,4'-thiobis(6-tert. butyl-m-cresol) | 0.1 | 2 | 3 | 4 |
| 9 | Diester of 3,3'-thiodipropionic acid and 3-hydroxy-2,2,4-trimethylpentyl isobutyrate. | 0.5 | | | |
|   | 4,4'-thiobis(6-tert. butyl-m-cresol) | 0.3 | 2 | 2 | 4 |
| 10 | 2,6-ditertiary butyl-p-cresol | 0.5 | 5 | 6 | 8 |
| 11 | Diester of 3,3'-thiodipropionic acid and 3-hydroxy-2,2,4-trimethylpentyl isobutyrate. | 0.5 | | | |
|   | 2,6-ditertiary butyl-p-cresol | 0.1 | 2 | 3 | 4 |
| 12 | Diester of 3,3'-thiodipropionic acid and 3-hydroxy-2,2,4-trimethylpentyl isobutyrate. | 0.5 | | | |
|   | 2,6-ditertiary butyl-p-cresol | 0.3 | 2 | 3 | 3 |
| 13 | 2,2'-methylenebis[6(1-methylcyclohexyl)-p-cresol]. | 0.5 | 5 | 5 | 6 |
| 14 | Diester of 3,3'-thiodipropionic acid and 3-hydroxy-2,2,4-trimethylpentyl isobutyrate. | 0.5 | | | |
|   | 2,2'-methylenebis[6(1-methylcyclohexyl)-p-cresol]. | 0.1 | 2 | 4 | 4 |
| 15 | Diester of 3,3'-thiodipropionic acid and 3-hydroxy-2,2,4-trimethylpentyl isobutyrate. | 0.5 | | | |
|   | 2,2'-methylenebis[6(1-methylcyclohexyl)-p-cresol]. | 0.3 | 2 | 3 | 4 |

It should be noted that samples 1, 5, 6, 8, 9, 11, 12, 14 and 15 correspond in formulation to the specific compositions of Examples 2–10, respectively.

These data of Table I demonstrate that at a concentration of about 0.5% by weight based on the poly-α-olefin, the diester of 3,3'-thiodipropionic acid and 3-hydroxy-2,2,4-trimethylpentyl isobutyrate is an effective stabilizer for poly-α-olefins such as polypropylene. Indeed, comparison of the data of sample 1 with the data of sample 2 shows that at equal concentrations the diester of this invention is substantially more effective as a poly-α-olefin stabilizer than dilauryl 3,3'-thiodipropionate, a diester which is a well-known, widely used, poly-α-olefin stabilizer and which is representative of the previously known diesters of 3,3'-thiodipropionic acid.

The data of Table I also indicate the synergism of the diester of this invention and various sterically hindered phenols. This can be seen by comparing the data of samples 5 and 6 with the data of samples 1 and 3, the data of samples 8 and 9 with the data of samples 1 and 7, the data of samples 11 and 12 with the data of samples 1 and 10, and the data of samples 14 and 15 with the data of samples 1 and 13.

The efficacy of the diester of 3,3'-thiodipropionic acid and 3-hydroxy-2,2,4-trimethylpentyl isobutyrate as a plasticizer is demonstrated by the data of Table II. To obtain these data three samples of a conventional, crystalline polypropylene were procured. To two of the samples was added the diester of 3,3'-thiodipropionic acid and 3-hydroxy-2,2,4-trimethylpentyl isobutyrate. The quantity of the diester in the case of one of the samples was about 5% by weight of the resulting composition. The quantity of the diester in the case of the other sample was about 10% by weight of the resulting composition. Each sample was then milled at 190° C. for 10 minutes. The milled samples were then granulated and test specimens of the samples prepared by injection molding on a 2–3 ounce Impco molding machine. Various, conventional, physical measurements were then made on the test specimens. The measurement data and other information are tabulated in the following Table II.

TABLE II

|  | Sample No. | | |
|---|---|---|---|
|  | 1 | 2 | 3 |
| Sample Components: | | | |
| Crystalline polypropylene (percent by weight of sample) | 100 | 95 | 90 |
| Diester of 3,3'-thiodipropionic acid and 3-hydroxy-2,2,4-trimethylpentyl isobutyrate (percent by weight of sample) | 0 | 5 | 10 |
| Flow Rate | 3.50 | 7.25 | 12.8 |
| Density | .9092 | .9100 | .9109 |
| Tensile Strength per square inch at yield | 4,460 | 4,100 | 3,980 |
| Stiffness in Flexure | 145,000 | 120,000 | 110,000 |
| Brittleness Temperature, ° C | +20 | −15 | −25 |
| Vicat Softening Point, ° C | 146.0 | 143.0 | 140.2 |

Samples 2 and 3, it will be observed, correspond in composition to the formulations of Examples 11 and 12, respectively.

These data of Table II show the improvement in properties, particularly in brittle point, obtained in adding the diester of 3,3'-thiodipropionic acid and 3-hydroxy-2,2,4-trimethylpentyl isobutyrate to an isotactic poly-α-olefin such as crystalline polypropylene. At no stage of the testing of samples 2 and 3 was there any evidence of incompatibility of the diester of this invention. Hence, as the data of Table II demonstrate, not only is the diester of 3,3'-thiodipropionic acid and 3-hydroxy-2,2,4-trimethylpentyl isobutyrate an outstanding stabilizer for poly-α-olefins such as polypropylene but also an outstanding plasticizer for poly-α-olefins such as polypropylene. A feature of advantage of the diester of this invention is its liquid state at normal temperatures. Such a state is desired since it enables the additive to be added to the poly-α-olefin by metering, a desired procedure.

Thus, there is provided a new, poly-α-olefin stabilizer-plasticizer. Moreover, there is provided a poly-α-olefin composition protected against oxidative degradation. In addition, there is provided a crystalline poly-α-olefin composition having a lower brittle point than the crystalline poly-α-olefin itself.

Other features, advantages and embodiments of the invention will be apparent to those in the exercise of ordinary skill in the art after reading the foregoing disclosure. In this connection, while this invention has been described in considerable detail relative to specific embodiments thereof, variations and modifications of these embodiments can be effected within the spirit and scope of the invention as disclosed and claimed.

The embodiments of the invention in which an exclusive property or privilege is claimed are defined as follows:

1. Normally solid poly-mono-α-olefinic material of at least one mono-α-olefin having 2–10 carbon atoms, containing the diester of 3,3′-thiodipropionic acid and 3-hydroxy-2,2,4-trimethylpentyl isobutyrate at a stabilizing amount.

2. Normally solid poly-mono-α-olefinic material of at least one mono-α-olefin having 2–10 carbon atoms, containing the diester of 3,3′-thiodipropionic acid and 3-hydroxy-2,2,4-trimethylpentyl isobutyrate at a concentration in a range from about 0.01 to about 10% by weight of said poly-α-olefin.

3. Normally solid poly-mono-α-olefinic material of at least one mono-α-olefin having 2–10 carbon atoms, containing the diester of 3,3′-thiodipropionic acid and 3-hydroxy-2,2,4-trimethylpentyl isobutyrate at a concentration in a range from about 0.05 to about 5% by weight of said poly-α-olefin.

4. A crystalline polypropylene containing the diester of 3,3′-thiodipropionic acid and 3-hydroxy-2,2,4-trimethylpentyl isobutyrate at a concentration in a range from about 0.01 to about 10% by weight of said poly-α-olefin.

5. Normally solid poly-mono-α-olefinic material of at least one mono-α-olefin having 2–10 carbon atoms, containing at a protective concentration a synergistic mixture consisting essentially of (1) the diester of 3,3′-thiodipropionic acid and 3-hydroxy-2,2,4-trimethylpentyl isobutyrate and (2) a sterically hindered phenolic antioxidant selected from the group consisting of 2,6-dialkyl-p-cresols, alkylidene bisphenols and thio bisphenols, the weight ratio of the diester to the sterically hindered phenolic antioxidant being in a range from about 1:20 to about 20:1.

6. Normally solid poly-mono-α-olefinic material of at least one mono-α-olefin having 2–10 carbon atoms, containing at a concentration in a range from about 0.01 to about 10% by weight of said poly-α-olefin a synergistic mixture consisting essentially of (1) the diester of 3,3′-thiodipropionic acid and 3-hydroxy-2,2,4-trimethylpentyl isobutyrate and (2) a sterically hindered phenolic antioxidant selected from the group consisting of 2,6-dialkyl-p-cresols, alkylidene bisphenols and thio bisphenols, the weight ratio of the diester to the sterically hindered phenolic antioxidant being in a range from about 1:20 to about 20:1.

7. A normally solid polypropylene containing at a concentration in a range from about 0.05 to about 5% by weight of said polypropylene a synergistic mixture consisting essentially of (1) the diester of 3,3′-thiodipropionic acid and 3-hydroxy-2,2,4-trimethylpentyl isobutyrate and (2) a sterically hindered phenolic antioxidant selected from the group consisting of 2,6-dialkyl-p-cresols, alkylidene bisphenols and thio bisphenols, the weight ratio of the diester to the sterically hindered phenolic antioxidant being in a range from about 1:10 to about 10:1.

8. A normally solid polypropylene containing at a concentration in a range from about 0.05 to about 5% by weight of said polypropylene a synergistic mixture consisting essentially of (1) the diester of 3,3′-thiodipropionic acid and 3-hydroxy-2,2,4-trimethylpentyl isobutyrate and (2) an alkylidenebis(alkylphenol), the weight ratio of the diester to said alkylidenebis(alkylphenol) being in a range from about 1:10 to about 10:1.

9. A composition according to claim 8 wherein said alkylidenebis(alkylphenol) is 4,4′-butylidenebis(6-tert. butyl-m-cresol).

10. A composition according to claim 8 wherein said alkylidenebis(alkylphenol) is 2,2′-methylenebis[6(1-methylcyclohexyl)-p-cresol].

11. A normally solid polypropylene containing at a concentration in a range from about 0.05 to about 5% by weight of said polypropylene a synergistic mixture consisting essentially of (1) the diester of 3,3′-thiodipropionic acid and 3-hydroxy-2,2,4-trimethylpentyl isobutyrate and (2) a thiobisphenol, the weight ratio of the diester to said thiobisphenol being in a range from about 1:10 to about 10:1.

12. A composition according to claim 11 wherein said thiobisphenol is 4,4′-thiobis(6-tert. butyl-m-cresol).

13. A normally solid polypropylene containing at a concentration in a range from about 0.05 to about 5% by weight of said polypropylene a synergistic mixture consisting essentially of (1) the diester of 3,3′-thiodipropionic acid and 3-hydroxy-2,2,4-trimethylpentyl isobutyrate and (2) a 2,6-dialkyl-p-cresol, the weight ratio of the diester to said 2,6-dialkyl-p-cresol being in a range from about 1:10 to about 10:1.

14. A composition according to claim 13 wherein said 2,6-dialkyl-p-cresol is 2,6-di-tert. butyl-p-cresol.

15. A shaped product selected from the group consisting of fibers, films, extruded and molded articles of a normally solid poly-mono-α-olefinic material of at least one mono-α-olefin having 2–10 carbon atoms containing a stabilizing amount of the diester of 3,3′-thiodipropionic acid and 3-hydroxy-2,2,4-trimethylpentyl isobutyrate.

16. A shaped product selected from the group consisting of fibers, films, extruded and molded articles of a normally solid poly-mono-α-olefinic material of at least one mono-α-olefin having 2–10 carbon atoms containing at a concentration in a range from about 0.01 to about 10% by weight of said poly-α-olefin, a synergistic mixture consisting essentially of (1) the diester of 3,3′-thiodipropionic acid and 3-hydroxy-2,2,4-trimethylpentyl isobutyrate and (2) a sterically hindered phenolic antioxidant selected from the group consisting of 2,6-dialkyl-p-cresols, alkylidene bisphenols, and thio bisphenols, the weight ratio of the diester to the sterically hindered phenolic antioxidant being in a range from about 1:20 to about 20:1.

17. A composition capable of synergistic stabilizer activity when incorporated in poly-α-olefinic material, said composition consisting essentially of (1) the diester of 3,3′-thiodipropionic acid and 3-hydroxy-2,2,4-trimethylpentyl isobutyrate and (2) a sterically hindered phenolic antioxidant, the weight ratio of the diester to the sterically hindered phenolic antioxidant being in a range from about 1:20 to about 20:1.

18. A composition capable of synergistic stabilizer activity when incorporated in poly-α-olefinic material, said composition consisting essentially of (1) the diester of 3,3′-thiodipropionic acid and 3-hydroxy-2,2,4-trimethylpentyl isobutyrate and (2) a sterically hindered phenolic antioxidant, the weight ratio of the diester to the sterically hindered phenolic antioxidant being in a range from about 1:10 to about 10:1.

References Cited by the Examiner

UNITED STATES PATENTS

| | | | |
|---|---|---|---|
| 2,425,225 | 8/1947 | Bearse et al. | 260—481 |
| 2,468,725 | 5/1949 | Gresham et al. | 260—481 |
| 2,519,755 | 8/1950 | Gribbins | 260—45.85 |
| 2,956,982 | 10/1960 | McCall et al. | 260—45.85 |
| 2,980,729 | 4/1961 | Buret | 260—481 |

FOREIGN PATENTS 1,248,217  10/1960  France.

LEON J. BERCOVITZ, *Primary Examiner.*

G. W. RAUCHFUSS, *Assistant Examiner.*